Jan. 2, 1951 M. SCHAER 2,536,663
PRESSURE REGULATING SYSTEM FOR FILTERS
Filed Oct. 17, 1944
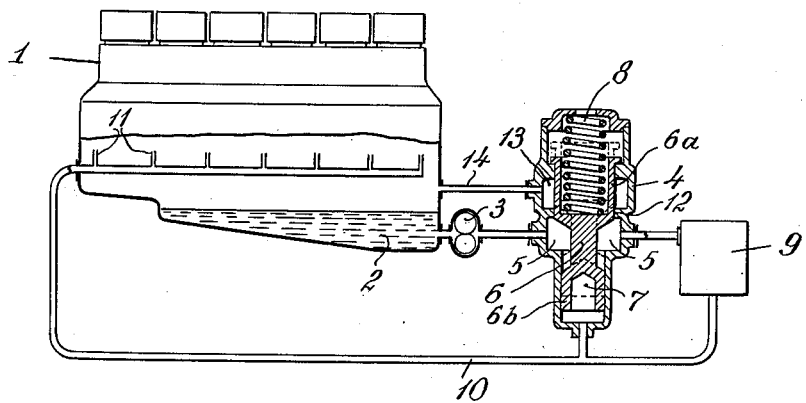
INVENTOR
MAX SCHAER
BY
ATTORNEYS Patented Jan. 2, 1951

2,536,663

UNITED STATES PATENT OFFICE 2,536,663

PRESSURE REGULATING SYSTEM FOR FILTERS

Max Schaer, Winterthur, Switzerland, assignor to Sulzer Frères, Société Anonyme, Winterthur, Switzerland Application October 17, 1944, Serial No. 559,060
In Switzerland February 24, 1944

3 Claims. (Cl. 210—150)

The invention relates to a pressure regulating and safety overflow valve in series in a regulating fluid or lubricant pressure circulation circuit that includes a fluid filter and consists in the use of a two-surface, single-acting piston as a valve body for controlling the overflow opening, which piston is connected to the circuit pipes before and after the filter in such a way that the pressure before the filter at which the valve responds to open the overflow increases with increasing filter resistance.

By the expression "two-surface, single-acting piston" is meant a member functioning as a piston having two surfaces separately exposed to fluid pressures, both of which exert force in the same direction.

In the regulating fluid or lubricant pressure circulation circuits of engines, valves are usually provided which prevent the pressure anywhere in the system from rising above a certain value. These valves tend to keep the pressure constant in the zone of critical circulation. Very often it is considered necessary to provide separate safety and pressure regulating valves, as it is desired to keep the pressure after the filter constant, while the pressure before the filter must be limited to a certain value for purpose of safety.

These separate valves have various disadvantages.

Thus, if the oil is cold, the filter will have a greater resistance, so that the pressure before the filter will rise and, as experience shows, may rise above the value which has proved to be a suitable setting of the safety valve for continuous service. The valve therefore blows off. The quantity of lubricant passing through the filter is thus limited, and the pressure after the filter in many cases sinks below the value to be maintained by the pressure regulating valve, unless the filter has been chosen particularly large in order to prevent this. Moreover, the use of a separate safety valve necessarily set at a value appropriate for normal service viscosities inherently makes it take longer for the cold lubricant to flow off from the filter and for normal service to be established.

In the device proposed by the invention these disadvantages are eliminated in that one valve only is provided which, however, is controlled in accordance with the pressures both before and after the filter. Owing to the employment as a regulating member of a two-surface, single-acting piston whose smaller piston surface is exposed to the pressure after the filter and whose larger piston surface is exposed to the pressure before the filter, the pressure before the filter needed to make the valve respond must be greater whenever the pressure after the filter is lower. This is the case in particular when the resistance in the filter, and thus the difference between the two pressures, becomes greater, for instance at low oil temperature.

The construction according to the invention, however, offers an advantage not only in the case of cold oil, but also in normal service. On the one hand, through the greater difference of the pressure gauge indications for the pressures before and after the filter, any choking of the filter makes itself more clearly apparent to the operating staff, and on the other hand the possibility is also provided of continuing service in these conditions for some length of time, for instance till the next pause in service, as the safety valve before the filter does not now blow off immediately the normal maximum service pressure is reached and thus render impossible the passage of oil through the filter to the lubricating or regulating points, but permits an increase of this pressure such that a sufficient provision of lubricant is still ensured.

An embodiment of the invention applied to an internal combustion engine plant is shown diagrammatically in the drawing.

The pump 3 draws the lubricant, for instance oil, out of the sump 2 of the internal combustion engine 1, delivers it into the space 5 of the valve casing 4 and thence to the filter 9, from whence it passes through the pipe 10 to the lubricating points 11 of the engine 1. From the pipe 10 the oil can pass into the space 7 below the piston 6, while from the space 5, when the piston 6 is raised (position shown in dotted lines), it can emerge at the point 12 into the space 13 and from there can flow back through the overflow pipe 14 into the sump 2 of the engine 1.

In order to raise the piston 6 far enough for the oil to pass at the point 12 from the space 5 into the space 13, the sum of the force exerted by oil pressure in the space 5 on the upper part 6a of the piston 6 and the force exerted by oil pressure in the space 7 on the lower part 6b of the piston 6 must attain a total value which exceeds the force of the spring 8. When the pressure on one part of the piston is low, it thus follows that the pressure on the other part of the piston must be compensatingly high if the force of the spring 8 is to be exceeded. In particular, if the pressure in the pipe 10 after the filter 9, and thus the pressure exerted on the piston part 6b of smaller diameter, is comparatively low, the pressure in the pipe and the space 5 before the filter, and thus the pressure exerted on the piston part 6a of larger diameter, will have to be comparatively high in order to cause the valve to respond and to open the outlet 12.

Thus the pressure before the filter 9 at which the piston valve 6 responds will increase with increasing filter resistance. If the resistance in the filter 9 is great, for instance in the case of cold oil, there arises a comparatively great difference between the pressures in the spaces 5 and 7, the pressure before the filter being comparatively high. When the filter resistance is smaller (for instance in the case of warm lubricant) the pressure in the space 7 becomes higher, and that in the space 5 lower.

The piston 6 thus has an equalising effect both for the pressure before and after the filter 9. When the oil temperature is high, and the filter resistance thus becomes very small, energy can be saved by a valve according to the invention. Instead of the oil delivered in excess being allowed to flow off through the pressure regulating valve arranged after the filter and the pump being allowed to work continuously against a high delivery pressure, the pressure after the filter rises somewhat relatively to this delivery pressure, whereby the pressure before the filter, at which the valve permits the oil to flow off, falls.

I claim:

1. In a pressure fluid circulation system, the combination including a source of fluid, a force pump drawing fluid from said source, a delivery passage leading from said pump to points of fluid use, a filter in said delivery passage, an overflow passage leading back to said source and a pressure responsive overflow valve assembly connecting said delivery passage before the filter to said overflow passage, said valve assembly including a two-surface single acting piston, one surface of which is exposed to the pressure in the delivery passage before, and the other, after the filter, which regulates flow from delivery passage to overflow passage in response to the sum of the forces on the two surfaces.

2. The combination of claim 1 in which the valve assembly includes a valve casing member having a first cylinder portion, connected at the bottom to the delivery passage after the filter, in which one piston surface runs and a second cylinder portion, connected at the bottom to the delivery passage before the filter, in which the other piston surface runs, said second cylinder portion being further connected at the top to the overflow passage, the distance separating the two passage connections to said cylinder portion being less than the whole travel of the piston, whereby said piston serves as a slide valve controlling flow through the overflow passage.

3. The combination of claim 1 in which the piston surface exposed to pressure in the delivery passage before the filter is the greater.

MAX SCHAER.

REFERENCES CITED

The following references are of record in the file of this patent:

UNITED STATES PATENTS

| Number | Name | Date |
|---|---|---|
| 2,072,180 | Paton | Mar. 2, 1937 |
| 2,103,299 | Ravnsbeck | Dec. 28, 1937 |
| 2,138,969 | Hobbs | Dec. 6, 1938 |
| 2,423,329 | Le Claire | July 1, 1947 |
| 2,460,048 | Von Wangenheim | Jan. 25, 1949 |

FOREIGN PATENTS

| Number | Country | Date |
|---|---|---|
| 3,647 | Great Britain | of 1913 |